United States Patent
Mycynek et al.

(10) Patent No.: US 6,239,848 B1
(45) Date of Patent: May 29, 2001

(54) HDTV RECEIVER HAVING FAST DIGITAL IF AGC AND ANALOG RF AGC

(75) Inventors: Victor G. Mycynek, Des Plaines; Rudolf Turner, Hawthorn Woods, both of IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/477,863

(22) Filed: Jan. 5, 2000

(51) Int. Cl.⁷ .............................. H04N 5/52; H04N 5/455
(52) U.S. Cl. ............................. 348/678; 348/726
(58) Field of Search .................... 348/678, 726, 348/679, 685, 255, 471, 495, 528, 537, 682, 727, 638, 639, 641, 21; H04N 5/52, 5/455

(56) References Cited

U.S. PATENT DOCUMENTS

| | | | |
|---|---|---|---|
| 5,565,932 | * 10/1996 | Citta | 348/678 |
| 5,764,309 | * 6/1998 | Krishnamurthy | 348/678 |

\* cited by examiner

*Primary Examiner*—Sherrie Hsia

(57) ABSTRACT

An HDTV receiver includes an AGC system that develops an RF AGC voltage that is derived on an analog basis and an IF AGC voltage that is derived on a digital basis. The digital voltage is developed from an error signal that comprises the most significant bits of a continuously operated large accumulator that is supplied with the algebraically combined output of the digital signal and an AGC reference number.

5 Claims, 2 Drawing Sheets

HDTV RECEIVER HAVING FAST DIGITAL IF AGC AND ANALOG RF AGC

BACKGROUND OF THE INVENTION

This invention relates generally to digital data receivers and specifically to a novel AGC (automatic gain control) system for HDTV (high definition television) receivers. U.S. Pat. No. 5,565,932, entitled AGC SYSTEM WITH PILOT USING DIGITAL DATA REFERENCE, issued Oct. 15, 1996 to Zenith Electronics Corporation, describes a digital television signal that is formatted in a plurality of repetitive data segments, with each data segment consisting of a fixed number of multilevel symbols occurring at a constant symbol rate of 10.76 megasymbols per second. In a receiver, the multilevel symbols are converted to corresponding digital values and the pilot, that is represented by a DC offset in the signal, is removed. The symbols are sampled, accumulated and divided to derive an average symbol value. This value is compared to a reference average symbol value to develop an AGC voltage for controlling the IF gain (and thereby the RF gain) of the receiver.

Difficulties arise in the AGC processing of rapidly changing RF signals that reach the receiving antenna. The effects of phase, delay and signal strength of dynamically ghosted signals, or of atmospheric conditions, can result in rapid changes in the total received RF signal level. A fast-acting AGC system in a receiver will tend to minimize such changes, resulting in less clipping in the analog processing circuits, particularly the IF circuits. If a signal is severely clipped, digital data will be lost and the receiver error correction circuitry will begin to fail. A fast receiver AGC will also reduce the speed requirements on the receiver equalizer, a task of which is to cancel the amplitude variations in the received signal.

Fast AGC systems are also particularly effective against zero or short delay dynamic ghosts. Such ghosts often occur in a home environment when people walk in front of an indoor antenna. In these instances, the delays are very short between the received direct and ghosted signals and the effect is much like a fast varying attenuation of a received signal. Because the tuner is designed to accommodate a large range of input signals, distortion is low, even in the presence of a dynamically changing RF input signal. Because of this, the IF AGC can be called upon to immediately track and compensate for fast moving RF signal variations and the tuner AGC can be designed to adjust its gain at a much lower rate. In the implementation of this invention, the fast AGC is applied to the IF whenever called for and is not dependent upon the slower, non-linear tuner AGC and the tuner AGC delay point.

With the invention, the IF AGC performance is optimized for speed, by employing a large capacity, continuously operated, with the most significant bits of the accumulated value being the generated AGC error correction signal. The use of the accumulator retains more resolution from the sampled data signal and the system can therefore operate in a controlled manner at a higher AGC speed. Among the benefits are: control is more precise in that errors associated with analog circuit leakage currents are eliminated; the AGC delay point is digitally stored, eliminating the need for a potentiometer; and digital averaging techniques can be applied to the detected amplitude of the recovered signal.

OBJECTS OF THE INVENTION

A principal object of the invention is to provide a novel AGC system for a digital television signal receiver.

Another object of the invention is to provide an improved digital IF AGC system.

A further object of the invention is to provide an improved digital, high speed IF AGC system that incorporates a continuously operated accumulator.

BRIEF DESCRIPTION OF THE DRAWINGS

These and other objects and advantages of the invention will be apparent upon reading the following description in conjunction with the drawings in which.

DETAILED DESCRIPTION OF THE INVENTION

Figure 1:
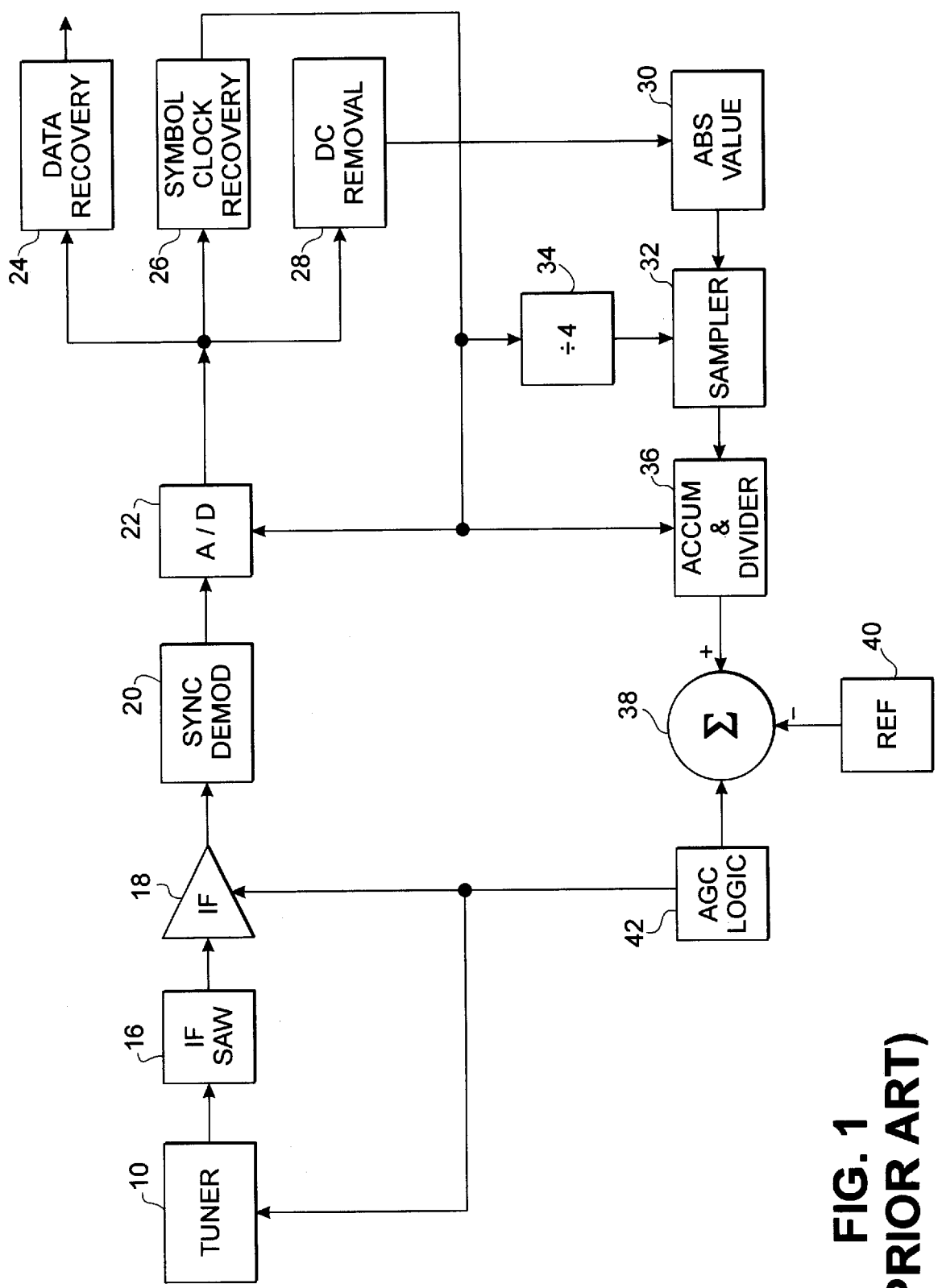
FIG. 1 is a simplified block diagram of a prior art digital television receiver.

Referring to FIG. 1, a received RF signal is converted to an IF signal by a tuner 10. The IF output of tuner 10 is supplied to a SAW (surface acoustic wave) filter 16 and thence to an IF amplifier 18. The output of IF amplifier 18 is supplied to a synchronous demodulator 20 that in turn feeds an A/D (analog to digital) converter 22 in which the amplitudes of the received symbols are converted to corresponding digital values. A/D converter 22 supplies a data recovery circuit 24 where the data symbols are recovered, a symbol clock recovery circuit 26, where timing signals are developed based upon synchronization information in the received signal; and a DC removal circuit 28 where the DC is removed. The DC removal circuit may also comprise a linear filter such as a post comb filter. The DC represents the pilot and uniformly affects all symbol values in the form of an offset. The output of the DC removal circuit 28 is supplied to an absolute value circuit 30, which provides an output representing the magnitude of the symbols. Absolute value circuit 30 rectifies the values of the received symbols which may assume negative as well as positive levels. The absolute value circuit 30 supplies its output to a sampler 32, which is controlled by a divide-by-four counter 34.

Symbol clock recovery circuit 26 provides a timing signal to A/D converter 22, divide-by-four counter 34 and an accumulator and divider circuit 36, which is also supplied with the output of sampler 32. This timing signal preferably comprises a clock signal at the symbol rate of 10.76 megasymbols per second. The output of the accumulator and divider circuit 36 comprises the average value of the sampled data symbols over a predetermined time interval and is supplied to the positive input terminal of a combiner 38. The negative input terminal of combiner 38 is supplied with a reference AGC offset 40 representing the known average value of the symbols. This value is based upon the symbols occurring randomly and a knowledge of the symbol levels as determined from the VSB (vestigial sideband) mode of the signal. Subtraction of the AGC offset from the determined average symbol level represents an AGC signal that is supplied to an AGC logic block 42, which distributes the AGC signal between IF 18 and tuner 10.

Initially, both the tuner and IF AGC operate at maximum gain to assist in carrier acquisition because of the low level pilot in the signal. The sampler circuit 32 samples every nth symbol and supplies that value to accumulator and divider circuit 36, which accumulates the symbol values for a fixed number of sampled signals y and divides that amount by y to yield a derived average value of a received data symbol.

The determined average symbol value is compared with the AGC offset value and the AGC is developed for reducing the gain of the IF from maximum based upon the comparison. The tuner AGC is developed and applied in accordance with an algorithm that governs the desired relationship between the tuner and IF gains. It will be appreciated that the various elements of the receiver are under microprocessor control, which circuitry is omitted for the sake of simplicity.

Figure 2:
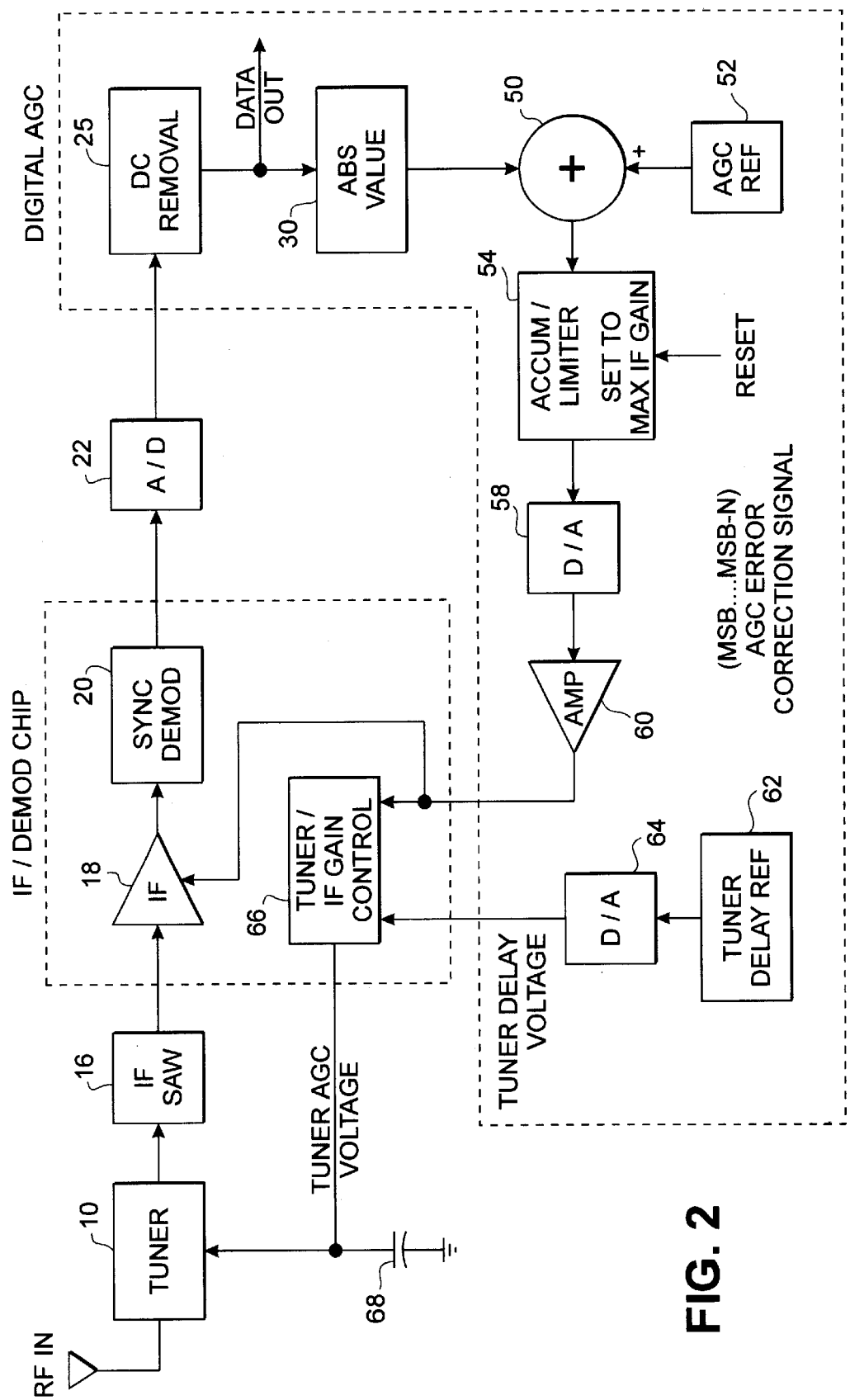
FIG. 2 is a simplified diagram of a digital television receiver of the invention that includes a digital IF AGC circuit and an analog RF AGC circuit.

In FIG. 2, a digital television receiver including the AGC system of the invention is shown. In contrast with the prior art arrangement of FIG. 1, the invention uses a digital IF AGC in conjunction with an analog RF AGC, as well as an accumulator that is operated on a continuous basis as opposed to the prior art sampled accumulator, which was reset at the start of each accumulation period. It will, of course, be understood that upon occurrence of an ON/OFF or channel change event, the accumulator of the invention (as well as that of the prior art circuit) is reset to maximum to force maximum tuner and IF gain. Also, the practice of gain controlling the tuner using a tuner delay input along with the IF AGC voltage is common in receiver AGC design.

The DC removal circuit 25 and absolute value circuit 30 of FIG. 1 are replicated in FIG. 2, with the output of absolute value circuit 30 being applied to the negative input of a combiner 50. A reference signal is applied to the positive input of combiner 50, the algebraically derived output of which is applied to a relatively large accumulator/limiter 54. This provides for a proper negative feedback condition for the AGC. The accumulator size is predetermined so as to preclude overflow under normal signal conditions. The output of accumulator/limiter 54, consisting of the most significant bits of its contents (an example being the use of bits 20-9), is applied to a D/A (digital to analog) converter 58. A balance between the size of accumulator/limiter 54, the number of bits supplied to D/A converter 58 and the gain of an interface amplifier 60 determines the speed and steady state accuracy of the AGC system. The output of D/A converter 58 is supplied, via interface amplifier 60, to IF amplifier 18 and to a tuner/IF gain control block 66. The RF AGC is developed using a tuner AGC delay reference 62 to delay the onset of the RF gain reduction until most or all of the IF gain reduction has been attained in accordance with common practice. The tuner delay is a constant that is determined at the factory in accordance with well-known tuner operating principles for optimizing the receiver's signal/distortion characteristics. The tuner delay reference 62 signal is applied through a D/A converter 64 to the tuner/IF gain control block 66, the output of which supplies a filter capacitor 68. The RF AGC voltage is taken from filter capacitor 68 and supplied to tuner 10. Thus, a digitally-derived AGC is applied to the IF, whereas the RF AGC is derived on an analog basis.

Upon the occurrence of a channel change or an ON/OFF event, accumulator/limiter 54 is set to a value that forces maximum IF gain to insure that the IF, and thus the tuner gain, is large enough for proper startup synchronization. After this the accumulator is operated continuously. The absolute value of each incoming data symbol level is combined with the preset AGC reference symbol value in combiner 50 and the algebraic result supplied to accumulator/limiter 54 which counts or accumulates the total. The error signal comprises the most significant bits of the total number in accumulator/limiter 54 and is converted to the analog voltage required to adjust the gain of IF amplifier 18 and tuner/IF gain control block 66. As the incoming data symbol level from absolute value circuit 30 approaches the symbol level represented by AGC reference 52, the input to accumulator/limiter 54 becomes smaller with the error signal falling to zero, stabilizing the average symbol level at the output of the absolute value circuit 30 to the AGC reference symbol level. With the output of the absolute value circuit 30 being stabilized, the data output signal, which is the input of DC removal circuit 25, is also stabilized.

The RF AGC is developed conventionally, with the voltage on capacitor 68 approaching a stable value after the digital IF AGC has first accommodated any fast changes in RF signal level. A further adjustment in IF AGC follows in response to any changes in tuner AGC stabilization. Taken together, the AGC system of the invention performs as well as the prior art system with the added advantage that overall receiver performance in the presence of fast changing RF signal strength is improved.

What has been described is a novel AGC system for a digital data receiver. It is recognized that numerous changes to the described embodiment of the invention will be apparent without departing from its true spirit and scope. The invention is to be limited only as defined in the claims.

What is claimed is:

1. An AGC system for a digital data receiver having a tuner that includes RF circuitry and IF circuitry and which receives a digital signal including a pilot and a plurality of multilevel data symbols occurring at a constant symbol rate comprising:

means for converting said received data symbols to digital values;

means for removing the effects of said pilot on said digital values;

digital AGC means including an accumulator for determining an error value;

means for controlling the gain of said IF circuitry based upon said error value; and;

analog AGC means including capacitance means for controlling the gain of said RF circuitry.

2. The system of claim 1, wherein said accumulator is operated continuously.

3. The system of claim 2, wherein the most significant bits in said accumulator form said error value.

4. The system of claim 3, further including:

a combiner supplied with said digital values;

a reference digital value coupled to said combiner; and the output of said combiner connected to said accumulator.

5. An AGC system for a digital data receiver having a tuner that includes RF circuitry and IF circuitry and which receives a digital signal including a pilot and a plurality of multilevel data symbols occurring at a constant symbol rate comprising:

means for converting said received data symbols to digital values;

means for removing the effects of said pilot on said digital values;

digital AGC means including a continuously operated accumulator for determining an error value;

the most significant bits of the value in said accumulator comprising said error value;

a combiner supplied with said digital values;

a reference digital value coupled to said combiner, the output of said combiner connected to said accumulator;

means for controlling the gain of said IF circuitry based upon said error value; and;

analog AGC means including capacitance means for controlling the gain of said RF circuitry.

* * * * *